(12) United States Patent
Liu

(10) Patent No.: US 11,803,597 B2
(45) Date of Patent: Oct. 31, 2023

(54) DATA UPDATING METHOD, APPARATUS, SEARCH SERVER, TERMINAL AND STORAGE MEDIUM

(71) Applicant: Baidu Online Network Technology (Beijing) Co., Ltd., Beijing (CN)

(72) Inventor: Junqi Liu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 76 days.

(21) Appl. No.: 17/378,225

(22) Filed: Jul. 16, 2021

(65) Prior Publication Data
US 2021/0342406 A1 Nov. 4, 2021

Related U.S. Application Data

(63) Continuation of application No. PCT/CN2021/081142, filed on Mar. 16, 2021.

(30) Foreign Application Priority Data

Apr. 29, 2020 (CN) .......................... 202010357679.5

(51) Int. Cl.
*G06F 16/20* (2019.01)
*G06F 16/951* (2019.01)
(Continued)

(52) U.S. Cl.
CPC ........ *G06F 16/951* (2019.01); *G06F 16/2379* (2019.01); *G06F 16/9538* (2019.01)

(58) Field of Classification Search
CPC ............. G06F 16/2379; G06F 16/9538; G06F 16/9535; G06F 16/957
(Continued)

(56) References Cited

U.S. PATENT DOCUMENTS

2002/0169770 A1 11/2002 Kim et al.
2005/0071766 A1* 3/2005 Brill ...................... G06F 16/951
707/E17.108
(Continued)

FOREIGN PATENT DOCUMENTS

CN 1601528 A 3/2005
CN 101984429 A 3/2011
(Continued)

OTHER PUBLICATIONS

International Search report dated Apr. 26, 2021 issued in Patent Application No. PCT/CN2021/081142.
(Continued)

*Primary Examiner* — Vincent F Boccio
(74) *Attorney, Agent, or Firm* — Tucker Ellis LLP

(57) ABSTRACT

Embodiments of present application provide a data updating method, an apparatus, a search server, a terminal and a storage medium. A search server provides a terminal with a search result webpage including one or more webpages associated with a search keyword, where the search result webpage also includes a pre-stored webpage summary obtained by the search server by crawling webpage content of each webpage in advance; then the terminal crawls a target webpage triggered by a user to obtain a current webpage summary, and the terminal sends comparison information of consistency comparison between the current webpage summary and the pre-stored webpage summary to the search server; and finally the search server updates the pre-stored webpage summary of the target webpage according to the comparison information of the target webpage.

12 Claims, 3 Drawing Sheets

Receiving and showing a search result webpage provided by a search sever, where the search result webpage includes one or more webpages associated with a search keyword triggered by a user and a pre-stored webpage summary corresponding to each webpage, and the pre-stored webpage summary is summary information obtained by the search server by crawling webpage content of a webpage in advance — 201

Determining a target webpage in the search result webpage, and crawling webpage content of the target webpage to obtain a current webpage summary — 202

Performing consistency comparison between the current webpage summary and the pre-stored webpage summary to obtain comparison information, and sending the comparison information to the search server, so that the search server updates the pre-stored webpage summary according to the comparison information — 203

(51) Int. Cl.
*G06F 16/23* (2019.01)
*G06F 16/9538* (2019.01)

(58) Field of Classification Search
USPC .......................................................... 707/709
See application file for complete search history.

(56) References Cited

U.S. PATENT DOCUMENTS

| | | |
|---|---|---|
| 2006/0242553 A1 | 10/2006 | Kulas |
| 2007/0209080 A1 | 9/2007 | Ture et al. |
| 2013/0117645 A1* | 5/2013 | Butlin ................... G06F 16/958 715/234 |
| 2016/0055132 A1* | 2/2016 | Garrison ............... G06F 16/958 715/235 |
| 2016/0188717 A1* | 6/2016 | Rosenberg ............ G06F 16/951 707/689 |
| 2016/0232237 A1 | 8/2016 | Yuan |

FOREIGN PATENT DOCUMENTS

| | | |
|---|---|---|
| CN | 102135967 A | 7/2011 |
| CN | 102446191 A | 5/2012 |
| CN | 102663062 A | 9/2012 |
| CN | 103631888 A | 3/2014 |
| CN | 107123743 A | 9/2017 |
| CN | 108415941 A | 8/2018 |
| CN | 110795615 A | 2/2020 |
| CN | 111767442 A | 10/2020 |
| EP | 1 519 281 A2 | 3/2005 |
| JP | 2002-342371 A | 11/2002 |
| JP | 2005-135381 A | 5/2005 |
| JP | 2009-532751 A | 9/2009 |
| KR | 10-2005-0030542 A | 3/2005 |
| WO | 2007/114741 A1 | 10/2007 |
| WO | 2015/061290 A1 | 4/2015 |

OTHER PUBLICATIONS

Supplementary European Search Report of corresponding European Application No. 21748484, dated Oct. 19, 2022, 8 pages.
Notice of Reasons for Refusal of corresponding Japanese Patent Application No. 2021-575391, dated Jan. 31, 2023, 8 pages.
Office Action of corresponding Chinese Application No. 202010357679.5, dated Aug. 7, 2023, 9 pages.
Office Action of corresponding Korean Application No. 10-2021-7023258, dated Jun. 23, 2023, 10 pages.

* cited by examiner

DATA UPDATING METHOD, APPARATUS, SEARCH SERVER, TERMINAL AND STORAGE MEDIUM

CROSS-REFERENCE TO RELATED APPLICATIONS

This application is a continuation of International Application No. PCT/CN2021/081142, filed on Mar. 16, 2021, which claims priority to Chinese Patent Application No. 202010357679.5, filed to China National Intellectual Property Administration on Apr. 29, 2020 and entitled "Data Updating Method, Apparatus, Search Server, Terminal and Storage Medium". Both of the above applications are hereby incorporated by reference in their entireties.

TECHNICAL FIELD

The present application relates to the field of data processing technology, and in particular to intelligent search technology.

BACKGROUND

With the popularity of smart terminals, the amount of information data has exploded, which puts forward higher requirements on the processing capabilities of search servers.

In order to provide a user with more comprehensive search results, a search server needs to use crawler technology to crawl webpages, and when showing webpage search results, the search server synchronously shows the webpages and summary information obtained by crawling webpage content. In order to ensure the timeliness for searching results, the search server generally adopts a manner of regular crawling, i.e., crawling all webpages according to a preset time period.

However, as the amount of webpage data is huge, the manner of crawling all webpages regularly will make each crawling take a relatively long time and the efficiency is low.

SUMMARY

In view of the above technical problem, embodiments of the present application provide a data updating method, an apparatus, a search server, a terminal and a storage medium.

In a first aspect, the present application provides a data updating method, including:
  providing a terminal with a search result webpage, where the search result webpage includes one or more webpages associated with a search keyword and a pre-stored webpage summary corresponding to each webpage, and the pre-stored webpage summary is summary information obtained by crawling webpage content of a webpage in advance;
  receiving comparison information of a target webpage sent by the terminal, where the comparison information is obtained by the terminal by performing consistency comparison between a current webpage summary and the pre-stored webpage summary, and the current webpage summary is obtained by the terminal by crawling content of the target webpage when browsing the target webpage;
  updating the pre-stored webpage summary of the target webpage according to the comparison information of the target webpage.

In a second aspect, the present application provides a data updating method, including:
  receiving and showing a search result webpage provided by a search server, where the search result webpage includes one or more webpages associated with a search keyword triggered by a user and a pre-stored webpage summary corresponding to each webpage, and the pre-stored webpage summary is summary information obtained by the search server by crawling webpage content of a webpage in advance;
  determining a target webpage in the search result webpage, and crawling webpage content of the target webpage to obtain a current webpage summary;
  performing consistency comparison between the current webpage summary and the pre-stored webpage summary to obtain comparison information, and sending the comparison information to the search server, so that the search server updates the pre-stored webpage summary according to the comparison information.

In a third aspect, the present application provides a data updating apparatus, including:
  a communication module, a crawling module and an updating module;
  where the communication module is configured to provide a terminal with a search result webpage, where the search result webpage includes one or more webpages associated with a search keyword and a pre-stored webpage summary corresponding to each webpage, and the pre-stored webpage summary is summary information obtained by crawling webpage content of the webpage using the crawling module in advance;
  the communication module is further configured to receive comparison information of a target webpage sent by the terminal, where the comparison information is obtained by the terminal by performing consistency comparison between a current webpage summary and the pre-stored webpage summary, and the current webpage summary is obtained by the terminal by crawling content of the target webpage when browsing the target webpage;
  the updating module is configured to update the pre-stored webpage summary of the target webpage according to the comparison information of the target webpage.

In a fourth aspect, the present application provides a data updating apparatus, including:
  a transceiving module and a comparing module;
  where the transceiving module is configured to receive and show a search result webpage provided by a search server, where the search result webpage includes one or more webpages associated with a search keyword triggered by a user and a pre-stored webpage summary corresponding to each webpage, and the pre-stored webpage summary is summary information obtained by the search server by crawling webpage content of a webpage in advance;
  the comparing module is configured to determine a target webpage in the search result webpage and crawl webpage content of the target webpage to obtain a current webpage summary; and is further configured to perform consistency comparison between the current webpage summary and the pre-stored webpage summary to obtain comparison information;
  the transceiving module is further configured to send the comparison information to the search server, so that the search server updates the pre-stored webpage summary according to the comparison information.

In a fifth aspect, the present application provides a search server, including:

at least one processor; and a memory communicatively connected with the at least one processor; where, the memory stores instructions executable by the at least one processor, and the instructions are executed by the at least one processor to cause the at least one processor to perform the method as described in any one of the first aspect.

In a sixth aspect, the present application provides a terminal, including:

at least one processor; and a memory communicatively connected with the at least one processor; where, the memory stores instructions executable by the at least one processor, and the instructions are executed by the at least one processor to cause the at least one processor to perform the method as described in any one of the second aspect.

In a seventh aspect, the present application provides a non-transitory computer-readable storage medium, where the computer-readable storage medium stores computer instructions thereon, and when a processor executes the computer instructions, the method as described in any one of the first aspect is implemented.

In an eighth aspect, the present application provides a non-transitory computer-readable storage medium, where the computer-readable storage medium stores computer instructions thereon, and when a processor executes the computer instructions, the method as described in any one of the second aspect is implemented.

In a ninth aspect, the present application provides a computer program including program code, where the program code executes the method as described in the first aspect or the second aspect when a computer runs the computer program.

Using the data updating method, apparatus, search server, terminal and storage medium provided in the embodiments of the present application, a search server provides the terminal with a search result webpage including one or more webpages associated with a search keyword, where the search result webpage also includes a pre-stored webpage summary obtained by the search server by crawling webpage content of each webpage in advance; then the terminal crawls a target webpage triggered by a user to obtain a current webpage summary, and the terminal sends comparison information of consistency comparison between the current webpage summary and the pre-stored webpage summary to the search server; and finally the search server updates the pre-stored webpage summary of the target webpage according to the comparison information of the target webpage. Compared with the existing manner of crawling webpages regularly, the present application can enable the search server to quickly determine the webpage that needs to be re-crawled through the comparison information provided by the terminal, so as to crawl the webpage that needs to be re-crawled. On the basis of effectively reducing the workload of crawling and the time required for each crawling, the waste of crawler computing resources caused by crawling a large number of un-updated webpages multiple times is also avoided.

It should be understood that the content described in this section is not intended to identify key or important features of the embodiments of the present application, nor is it intended to limit the scope of the present application. Other features of the present application will be easily understood through the following description.

BRIEF DESCRIPTION OF DRAWINGS

The accompanying drawings are used to better understand solutions, and do not limit the present application. In the accompanying drawings.

DESCRIPTION OF EMBODIMENTS

Figure 1:
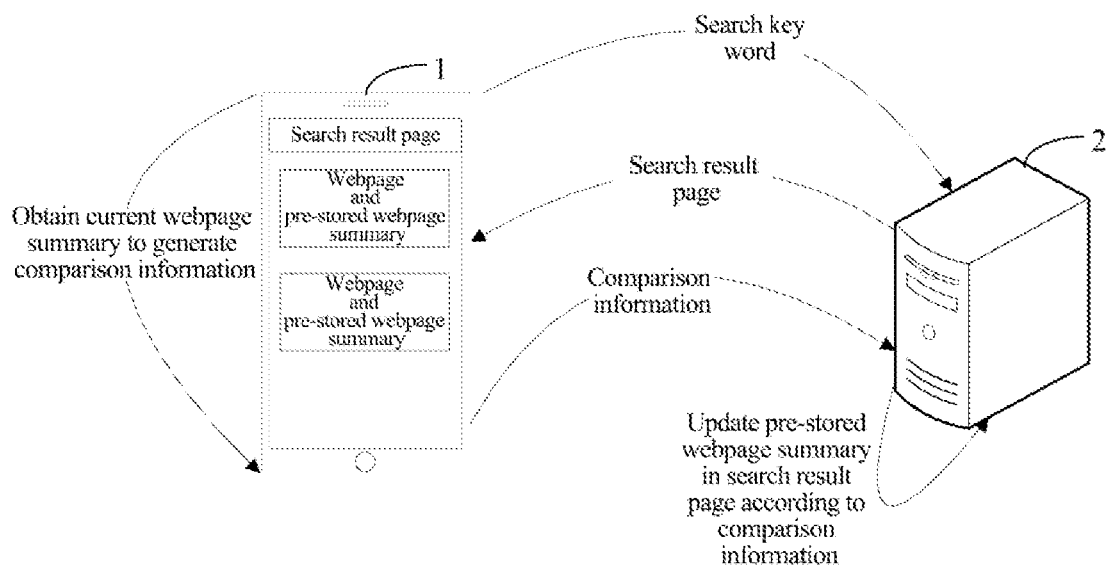
FIG. 1 is a diagram of a scenario which can implement a data updating method of embodiments of the present application.

The following describes exemplary embodiments of the present application in combination with the accompanying drawings, and includes various details of the embodiments of the present application to facilitate understanding, which shall be considered as merely exemplary. Therefore, those skilled in the art should realize that various changes and modifications can be made to the embodiments described herein without departing from the scope and spirit of the present application. Similarly, for the sake of clarity and conciseness, the description of well-known functions and structures is omitted in the following description.

A solution in the prior art is first introduced in detail in order to clearly understand the technical solutions of the present application.

With the popularity of smart terminals, the amount of information data has exploded, which puts forward higher requirements on the processing capabilities of search servers.

In the prior art, in order to provide a user with more comprehensive search results, a search server needs to use crawler technology to crawl webpages to obtain webpage content of each webpage and summary information corresponding to the webpage content. When the user enters a search keyword to search for information, the search server will find several webpages associated with the keyword from the webpage content obtained by the crawling, and show the summary information corresponding to the several webpages in a search result page, for the user to trigger selection and view. However, due to webpage updates, such manner readily suffers from a problem that the webpage summary information viewed by the user on the search result page is inconsistent with the actual webpage content of this webpage. Based on this problem, in the prior art, a manner of crawling webpages in a preset time period is used to ensure the timeliness for searching results.

However, this crawling manner is not efficient. On the one hand, the amount of the webpage data is huge, and crawling global webpages according to the preset time period requires a relatively long crawling time; on the other hand, the update speed of different webpages may also vary, and using such a crawling manner readily suffers from repeated crawling of a large number of un-updated webpages, for which crawler computing resources cannot be fully utilized.

In view of this problem, the inventor found in research that the search server can use resources of the terminal to help it complete determination of a webpage that needs to be re-crawled, and then crawl the webpage that needs to be re-crawled to improve the efficiency of crawling. Specifically, the search server provides the terminal with a search result webpage including one or more webpages associated with a search keyword, where the search result webpage also includes a pre-stored webpage summary obtained by the search server by crawling webpage content of each webpage in advance; then the terminal crawls a target webpage triggered by the user to obtain a current webpage summary, and the terminal sends comparison information of consistency comparison between the current webpage summary and the pre-stored webpage summary to the search server; and finally the search server updates the pre-stored webpage summary of the target webpage according to the comparison information of the target webpage. Compared with the existing manner of crawling webpages regularly, the present application can enable the search server to quickly determine the webpage that needs to be re-crawled through the comparison information provided by the terminal, so as to crawl the webpage that needs to be re-crawled. On the basis of effectively reducing the workload of crawling and the time required for each crawling, the waste of crawler computing resources caused by crawling a large number of un-updated webpages multiple times is also avoided.

The following describes an application scenario of a data updating method, an apparatus, a search server, a terminal and a storage medium provided by embodiments of the present application.

FIG. 1 is a diagram of a scenario which can implement a data updating method of embodiments of the present application. As shown in FIG. 1, an application scenario corresponding to a data updating method provided in an embodiment of the present application includes: a terminal 1 and a search server 2.

Each terminal 1 may specifically be a hardware device that can be used to interact with a user, and includes, but is not limited to, a smart phone, a tablet computer, a desktop computer, and the like. Under operations of the user, the terminal 1 can browse various webpages provided by the search server 2, such as search webpages and search result webpages. Under the triggering of the user, the terminal 1 can send various requests to the search server 2 based on a current webpage, such as a search request including a search keyword, an access request for accessing a target webpage provided in a search result webpage, etc.

The search server 2 may specifically be a hardware server, or a hardware carrier that carries a cloud server. The search server 2 can provide services such as keyword search and web browsing to the user of each terminal 1. Through the interaction with each terminal 1, the search server 2 will use the data updating method described in the following embodiments of the present application to determine a target webpage that needs to be re-crawled, and perform processing such as re-crawling on this target webpage.

The embodiments of the present application will be described in detail with reference to the drawings in the following.

Figure 2:
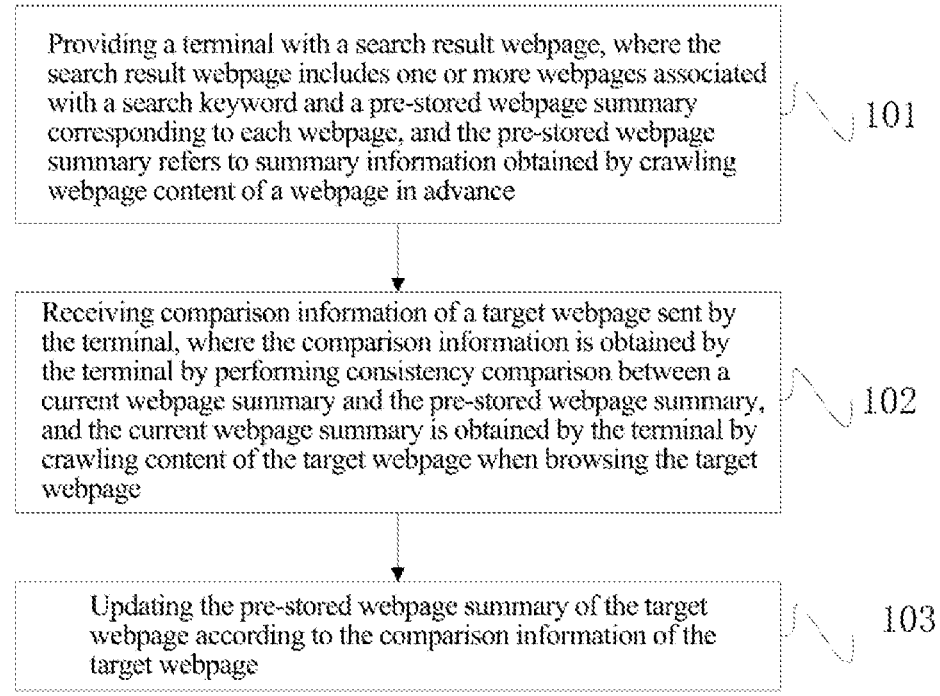
FIG. 2 is a schematic flowchart of a data updating method provided by the present application.

FIG. 2 is a schematic flowchart of a data updating method provided by the present application. As shown in FIG. 2, an executive entity of an embodiment of the present application is a data updating apparatus, and the data updating apparatus will be carried in the aforementioned search server.

The data updating method provided in this embodiment includes the following steps.

Step 101: providing a terminal with a search result webpage, where the search result webpage includes one or more webpages associated with a search keyword and a pre-stored webpage summary corresponding to each webpage, and the pre-stored webpage summary refers to summary information obtained by crawling webpage content of a webpage in advance.

In this embodiment, the search result webpage is a webpage provided by the search server to the terminal to indicate its search results.

Specifically, the terminal may input a search keyword in a search webpage provided by the search server, and the search server will invoke a search engine to search the entire network based on the search keyword, and generate a search result webpage to present to the terminal. The search result webpage will include one or more webpages and the pre-stored webpage summary corresponding to each webpage. These webpages are webpages associated with the search keyword. As to how to obtain webpages associated with the search keyword, a search strategy on which an existing search engine is based can be adopted, and the present application does not impose any limitation on this. The pre-stored webpage summary is the summary information obtained by the search server by crawling webpage content of the entire network in advance, an existing crawling strategy may also be referred to for the crawling manner thereof, and the present application does not impose any limitation on this.

Step 102: receiving comparison information of a target webpage sent by the terminal, where the comparison information is obtained by the terminal by performing consistency comparison between a current webpage summary and the pre-stored webpage summary, and the current webpage summary is obtained by the terminal by crawling content of the target webpage when browsing the target webpage.

In the embodiment of the present application, similar to the existing webpage-based search manner, when the user views the search result webpage through the terminal, any webpage can be selected as the target webpage, so that the terminal initiates an access request for the target webpage to the search server and receives a link of the target webpage provided by the search server to access the target webpage. By this time, the difference from the existing manner is that, in the embodiment of the present application, when the terminal accesses the target webpage, the terminal will also crawl the webpage content of the target webpage to obtain the current webpage summary of the target webpage.

Then, the terminal compares the current webpage summary of the target webpage with the pre-stored webpage summary obtained through the search result webpage to determine the consistency of these two summaries. After the consistency comparison is completed, the terminal sends generated comparison information to the search server for processing.

Step 103: updating the pre-stored webpage summary of the target webpage according to the comparison information of the target webpage.

Finally, the search server will determine, according to the received comparison information, whether to re-crawl the target webpage, i.e., to update the pre-stored webpage summary of the target webpage. When the comparison information indicates that the pre-stored webpage summary is consistent with the current webpage summary, the target webpage has not updated its webpage content after being crawled by the search server last time, and by this time the search server may not crawl the target webpage and not update the pre-stored webpage summary. Conversely, when the comparison information indicates that the pre-stored webpage summary is inconsistent with the current webpage summary, the target webpage may have updated its webpage content after being crawled by the search server last time, and by this time the search server may perform re-crawling or other processing on the target webpage, so as to update the pre-stored webpage summary.

Compared with the existing manner of crawling webpages regularly, the manner provided by the above embodiment of the present application can enable the search server to quickly determine the webpage that needs to be re-crawled through the comparison information provided by the terminal, so as to crawl the webpage that needs to be re-crawled. On the basis of effectively reducing the workload of crawling and the time required for each crawling, the waste of crawler computing resources caused by crawling a large number of un-updated webpages multiple times is also avoided.

On the basis of the above embodiment, this embodiment also provides a specific implementation for updating the pre-stored webpage summary of the target webpage according to the comparison information of the target webpage:

optionally, in order to achieve rapid update of the pre-stored webpage summary, in one of optional implementations, the search server may also receive the current summary information of the target webpage, and the step 103 can include taking the current summary information as updated pre-stored webpage summary information of the target webpage. That is to say, in this embodiment, when the search server determines that the pre-stored webpage summary needs to be updated according to the comparison information, the pre-stored webpage summary can be replaced directly based on the received current webpage summary obtained by crawling by the terminal to achieve the updating of the pre-stored webpage summary. It is convenient that when each terminal searches out the target webpage next time, the pre-stored webpage summary is the updated webpage summary.

In an embodiment, in order to make the updated pre-stored webpage summary more accurate and comprehensive, in one of optional implementations, when the search server determines that the current webpage summary is inconsistent with the pre-stored webpage summary according to the comparison information of the target webpage, the step 103 can specifically include:

step 1031: crawling the target webpage, and obtaining an updated webpage summary;

step 1032: updating the pre-stored webpage summary using an obtained updated webpage summary.

Specifically, as described above, when the search server determines that the current webpage summary is inconsistent with the pre-stored webpage summary according to the comparison information of the target webpage, the search server needs to update the pre-stored webpage summary. In this embodiment, the search server may re-perform crawling processing on the target webpage first to obtain an updated webpage summary of the target webpage after re-crawling; then, the search server can update the pre-stored webpage summary based on the updated webpage summary to realize data update of a search page. In this way, the pre-stored webpage summary can be updated, so that when each terminal searches out the target webpage next time, the pre-stored webpage summary is the updated webpage summary.

On the basis of the above embodiment, with the development of webpage technology, when a webpage presents its webpage content, the presentation will be in a personalized manner according to configuration of a browsing side. This results in that in the embodiment of the present application, inconsistency between configuration of the search server and configuration of the terminal may lead to inconsistency in the comparison information. For example, when the geographic location where the search server is set up is different from the geographic location where the terminal is located, the webpage summaries obtained by the search server and the terminal crawling the webpage content of the same target webpage may be different; for another example, when an operator of a network where the search server is set up is different from an operator of a network where the terminal is located, the webpage summaries obtained by the search server and the terminal crawling the webpage content of the same target webpage may be different.

In order to avoid the impact of this situation on the data updating method provided in the embodiments of the present application, in an optional embodiment, after obtaining the updated webpage summary, the search server can also determine whether the pre-stored webpage summary is the same as the updated webpage summary or not, i.e., perform consistency comparison between the webpage summary obtained by a previous crawling and the webpage summary obtained by this crawling, to determine a reason for the inconsistency, which is reported by the terminal, between the current webpage summary and the pre-stored webpage summary.

In other words, when the updated webpage summary is the same as the pre-stored webpage summary, it can be determined that the inconsistency phenomenon in the comparison information reported by the terminal may be caused by different configurations of the search server and the terminal. By this time, the search server can collect terminal configuration information of the terminal, crawl the target webpage using a crawling manner corresponding to the terminal configuration information, and configure the obtained webpage summary as a pre-stored webpage summary of the target webpage obtained by searching under the terminal configuration information, so that the pre-stored webpage summary viewed by other terminals having the same terminal configuration information as the terminal when searching for the target webpage is configured in this way, and the pre-stored webpage summary viewed by other terminals that have different terminal configuration information from the terminal when searching for the target webpage is configured in other ways.

In this way, the personalized update of the pre-stored webpage summary can be realized, so that the terminals under different configurations can view the pre-stored webpage summary consistent with the terminal configuration information when searching, which improves the flexibility of information acquisition during searching.

Of course, in other optional embodiments, if the search server finds that the updated webpage summary is different from the pre-stored webpage summary, it can be determined that the webpage content of the target webpage has been updated definitely. By this time, the search server can directly take the updated webpage summary as the updated pre-stored webpage summary, that is, store the updated webpage summary as a new pre-stored webpage summary.

Using the data updating method provided in the embodiments of the present application, the search server provides the terminal with the search result webpage including one or more webpages associated with the search keyword, where the search result webpage also includes the pre-stored webpage summary obtained by the search server by crawling the webpage content of each webpage in advance; then the terminal crawls the target webpage triggered by the user to obtain the current webpage summary, and the terminal sends the comparison information of the consistency comparison between the current webpage summary and the pre-stored webpage summary to the search server; and finally the search server updates the pre-stored webpage summary of the target webpage according to the comparison information of the target webpage. Compared with the existing manner of crawling webpages regularly, the present application can enable the search server to quickly determine the webpage that needs to be re-crawled through the comparison information provided by the terminal, so as to crawl the webpage that needs to be re-crawled. On the basis of effectively reducing the workload of crawling and the time required for each crawling, the waste of crawler computing resources caused by crawling a large number of un-updated webpages multiple times is also avoided.

In addition, for some popular webpages, these webpages will go through a determination of whether they need to be re-crawled when they are searched and triggered at each time. In this way, it can be effectively ensured that the pre-stored webpage summaries of webpages which are frequently browsed are in real-time and effective, which is beneficial to maximize the use of crawler resources of the search server.

Figure 3:
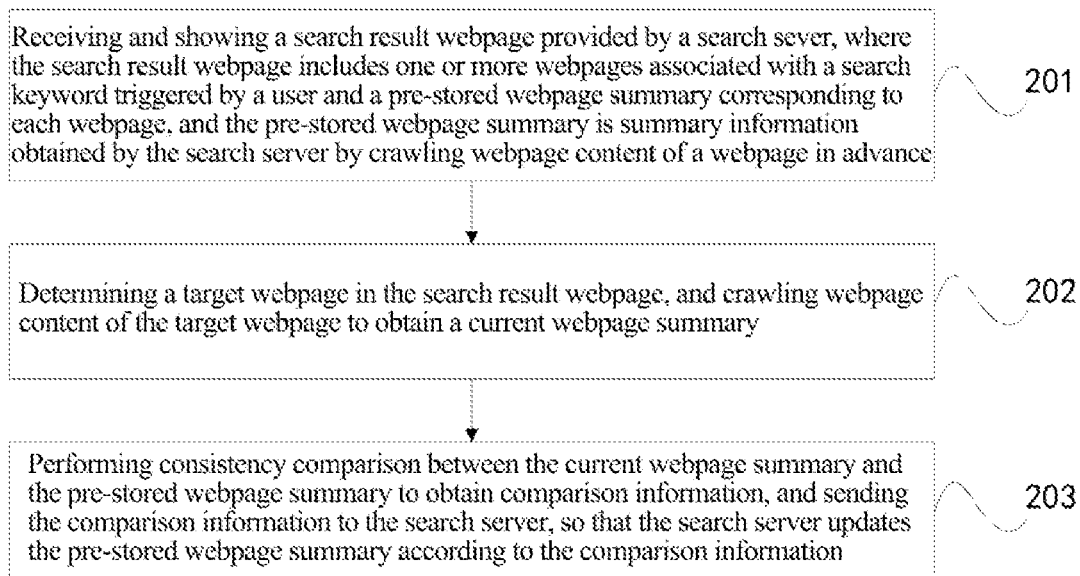
FIG. 3 is a schematic flowchart of another data updating method provided by the present application.

FIG. 3 is a schematic flowchart of another data updating method provided by the present application. As shown in FIG. 3, an executive entity of an embodiment of the present application is a data updating apparatus, and the data updating apparatus may be disposed in the aforementioned terminal.

The data updating method provided in this embodiment includes the following steps.

Step 201: receiving and showing a search result webpage provided by a search server, where the search result webpage includes one or more webpages associated with a search keyword triggered by a user and a pre-stored webpage summary corresponding to each webpage, and the pre-stored webpage summary is summary information obtained by the search server by crawling webpage content of a webpage in advance.

Step 202: determining a target webpage in the search result webpage, and crawling webpage content of the target webpage to obtain a current webpage summary.

Step 203: performing consistency comparison between the current webpage summary and the pre-stored webpage summary to obtain comparison information, and sending the comparison information to the search server, so that the search server updates the pre-stored webpage summary according to the comparison information.

Specifically, the terminal can receive a search service provided by the search server. In an initial page, the search server will provide a search webpage. The terminal can input a search keyword on the search webpage, and the search server will invoke a search engine to search the entire network based on the search keyword, and generate a search result webpage to present to the terminal.

The search result webpage provided by the search server will include one or more webpages and the pre-stored webpage summary corresponding to each webpage. These webpages are webpages associated with the search keyword. As to how to obtain webpages associated with the search keyword, a search strategy on which an existing search engine is based can be adopted, and the present application does not impose any limitation on this. The pre-stored webpage summary is the summary information obtained by the search server by crawling webpage content of the entire network in advance, an existing crawling strategy may also be referred to for the crawling manner thereof, and the present application does not impose any limitation on this.

Subsequently, when the user views the search result webpage through the terminal, any webpage can be selected as the target webpage, so that the terminal initiates an access request for the target webpage to the search server and receives a link of the target webpage provided by the search server to access the target webpage. That is, the terminal sends the search keyword triggered by the user to the search server, so that the search server generates the search result webpage according to the search keyword.

By this time, the difference from the existing manner is that, in the embodiment of the present application, when the terminal accesses the target webpage, the terminal will also crawl the webpage content of the target webpage to obtain the current webpage summary of the target webpage.

The terminal may compare the current webpage summary of the target webpage with the pre-stored webpage summary obtained through the search result webpage to determine the consistency of these two summaries. After the consistency comparison is completed, the terminal may send generated comparison information to the search server for processing.

Generally speaking, the search server will determine, according to the received comparison information, whether to re-crawl the target webpage, i.e., to update the pre-stored webpage summary of the target webpage. When the comparison information indicates that the pre-stored webpage summary is consistent with the current webpage summary, the target webpage has not updated its webpage content after being crawled by the search server last time, and by this time the search server may not crawl the target webpage and not update the pre-stored webpage summary. Conversely, when the comparison information indicates that the pre-stored webpage summary is inconsistent with the current webpage summary, the target webpage may have updated its webpage content after being crawled by the search server last time, and by this time the search server may perform re-crawling or other processing on the target webpage, so as to update the pre-stored webpage summary.

This embodiment provides a terminal-based data updating method, which can provide the search server with the comparison information of the target webpage, so that the search server updates the pre-stored webpage summary of the target webpage in the search result page based on the comparison information. In addition, the aforementioned embodiments can be referred to for the specific implementation for the search server to update the pre-stored webpage summary based on the comparison information, and details are not repeated in this embodiment.

In an optional embodiment, in order to ensure the accuracy of the comparison information provided to the search server, the terminal can also receive a crawling strategy sent by the search server. After obtaining the crawling strategy, the step 202 can specifically be using the crawling strategy to crawl the webpage content of the target webpage to obtain the current webpage summary.

The crawling strategy can be used to indicate a crawling processing manner adopted by the search server when crawling the webpage content, word conditions, semantic content, grammatical format for crawling, and so on.

The timing for the terminal to receive the crawling strategy may be the time when the terminal communicates with the search server, for example, when the terminal loads a search page provided by the search server, the terminal can directly obtain the crawling strategy provided by the search server; the timing for the terminal to obtain the crawling strategy may also be the time when the terminal receives the search result page provided by the search server, that is, the search server may send the search result page together with the crawling strategy to the terminal, for the terminal to receive and use. In this way, the crawling manner adopted by the terminal can be kept consistent with the crawling manner adopted by the search server, thereby ensuring the accuracy of the comparison information.

Figure 4:
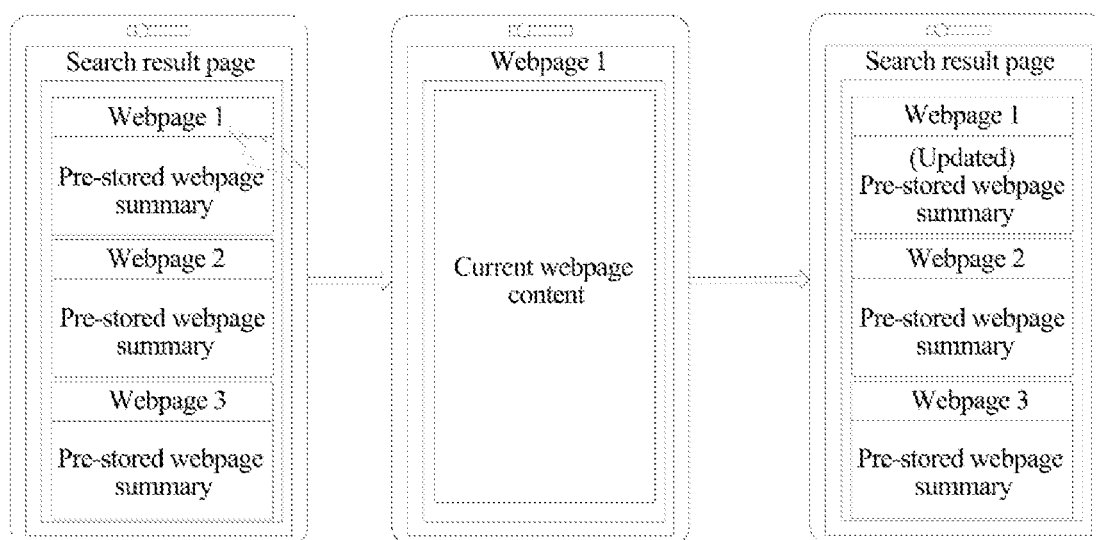
FIG. 4 is a schematic diagram of an interface of a data updating method provided by the present application.

FIG. 4 is a schematic diagram of an interface of a data updating method provided by the present application. As shown in FIG. 4, the terminal can receive a search result page provided by the search server, and search results obtained by the search server by searching for the search keyword are presented on the search result page, i.e., multiple webpages and a pre-stored webpage summary corresponding to each webpage. The user selects any webpage as the target webpage by triggering, such as webpage 1 as shown in the figure. By this time the terminal interface may trigger the display of webpage 1, but the backend of the terminal will start to crawl the webpage content of webpage 1 to obtain the aforementioned comparison information. It should be noted that the operation of obtaining the comparison information is not displayed and perceived in the frontend of the terminal, that is, the terminal interface will not present operation steps or operation results for the crawling and the comparison information. Finally, the terminal may send the comparison information to the search server, as shown in FIG. 4, and when the terminal searches for the search keyword again, the pre-stored webpage summary for webpage 1 in the search result page presented by the search server is already the updated webpage summary.

Using the data updating method provided in the embodiment of the present application, the search server provides the terminal with the search result webpage including one or more webpages associated with the search keyword, where the search result webpage also includes the pre-stored webpage summary obtained by the search server by crawling the webpage content of each webpage in advance; then the terminal crawls the target webpage triggered by the user to obtain the current webpage summary, and the terminal sends the comparison information of the consistency comparison between the current webpage summary and the pre-stored webpage summary to the search server; and finally the search server updates the pre-stored webpage summary of the target webpage according to the comparison information of the target webpage. Compared with the existing manner of crawling webpages regularly, the present application can enable the search server to quickly determine the webpage that needs to be re-crawled through the comparison information provided by the terminal, so as to crawl the webpage that needs to be re-crawled. On the basis of effectively reducing the workload of crawling and the time required for each crawling, the waste of crawler computing resources caused by crawling a large number of un-updated webpages multiple times is also avoided.

Figure 5:
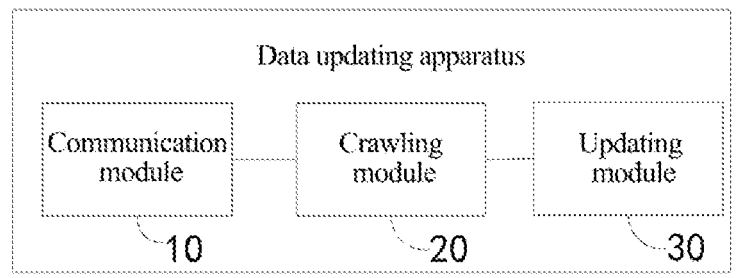
FIG. 5 is a schematic structural diagram of a data updating apparatus provided by the present application.

FIG. 5 is a schematic structural diagram of a data updating apparatus provided by the present application. As shown in FIG. 5, the data updating apparatus includes a communication module 10, a crawling module 20 and an updating module 30;

where the communication module 10 is configured to provide a terminal with a search result webpage, where the search result webpage includes one or more webpages associated with a search keyword and a pre-stored webpage summary corresponding to each webpage, and the pre-stored webpage summary is summary information obtained by crawling webpage content of a webpage using the crawling module 20 in advance;

the communication module 10 is further configured to receive comparison information of a target webpage sent by the terminal, where the comparison information is obtained by the terminal by performing consistency comparison between a current webpage summary and the pre-stored webpage summary, and the current webpage summary is obtained by the terminal by crawling content of the target webpage when browsing the target webpage;

the updating module 30 is configured to update the pre-stored webpage summary of the target webpage according to the comparison information of the target webpage.

In an optional embodiment, the crawling module 20 is specifically configured to: crawl the target webpage to obtain an updated webpage summary, when it is determined according to the comparison information of the target webpage that the current webpage summary is inconsistent with the pre-stored webpage summary;

the updating module 30 is specifically configured to update the pre-stored webpage summary using an obtained updated webpage summary.

In an optional embodiment, when the updated webpage summary is consistent with the pre-stored webpage summary, the communication module 10 is configured to collect terminal configuration information of the terminal;

the crawling module 20 is further configured to crawl the target webpage in a crawling manner corresponding to the terminal configuration information, the updating module 30 is configured to take a webpage summary obtained by the crawling module 20 as the pre-stored webpage summary that is showed when the target webpage is searched out under the terminal configuration information.

In an optional embodiment, when the updated webpage summary is different from the pre-stored webpage summary, the updating module 30 is further configured to take the updated webpage summary as an updated pre-stored webpage summary directly.

In an optional embodiment, the communication module 10 is further configured to receive current summary information of the target webpage;

the updating module 30 is specifically configured to take the current summary information as pre-stored webpage summary information of the target webpage.

The data updating apparatus provided in the present application can implement the technical solutions of the above method embodiments. The implementation principles and technical effects thereof are similar to the above method embodiments, and will not be repeated here.

In this embodiment, the search server provides the terminal with the search result webpage including one or more webpages associated with the search keyword, where the search result webpage also includes the pre-stored webpage summary obtained by the search server by crawling the webpage content of each webpage in advance; then the terminal crawls the target webpage triggered by the user to obtain the current webpage summary, and the terminal sends the comparison information of the consistency comparison between the current webpage summary and the pre-stored webpage summary to the search server; and finally the search server updates the pre-stored webpage summary of the target webpage according to the comparison information of the target webpage. Compared with the existing manner of crawling webpages regularly, the present application can enable the search server to quickly determine the webpage that needs to be re-crawled through the comparison information provided by the terminal, so as to crawl the webpage that needs to be re-crawled. On the basis of effectively reducing the workload of crawling and the time required for each crawling, the waste of crawler computing resources caused by crawling a large number of un-updated webpages multiple times is also avoided.

Figure 6:
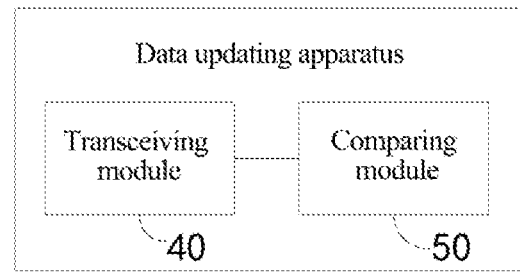
FIG. 6 is a schematic structural diagram of another data updating apparatus provided by the present application.

FIG. 6 is a schematic structural diagram of another data updating apparatus provided by the present application. As shown in FIG. 6, the data updating apparatus includes a transceiving module 40 and a comparing module 50;

where the transceiving module 40 is configured to receive and show a search result webpage provided by a search server, where the search result webpage includes one or more webpages associated with a search keyword triggered by a user and a pre-stored webpage summary corresponding to each webpage, and the pre-stored webpage summary is summary information obtained by the search server by crawling webpage content of a webpage in advance;

the comparing module 50 is configured to determine a target webpage in the search result webpage and crawl webpage content of the target webpage to obtain a current webpage summary; and is further configured to perform consistency comparison between the current webpage summary and the pre-stored webpage summary to obtain comparison information;

the transceiving module 40 is further configured to send the comparison information to the search server, so that the search server updates the pre-stored webpage summary according to the comparison information.

In an optional embodiment, the transceiving module 40 is further configured to receive a crawling strategy sent by the search server; a crawling module is further configured to use the crawling strategy to crawl the webpage content of the target webpage to obtain the current webpage summary.

In an optional embodiment, the transceiving module 40 is further configured to send the search keyword triggered by the user to the search server, so that the search server generates the search result webpage according to the search keyword.

The data updating apparatus provided in the present application can implement the technical solutions of the above method embodiments. The implementation principles and technical effects thereof are similar to the above method embodiments, and will not be repeated here.

In this embodiment, the search server provides the terminal with the search result webpage including one or more webpages associated with the search keyword, where the search result webpage also includes the pre-stored webpage summary obtained by the search server by crawling the webpage content of each webpage in advance; then the terminal crawls the target webpage triggered by the user to obtain the current webpage summary, and the terminal sends the comparison information of the consistency comparison between the current webpage summary and the pre-stored webpage summary to the search server; and finally the search server updates the pre-stored webpage summary of the target webpage according to the comparison information of the target webpage. Compared with the existing manner of crawling webpages regularly, the present application can enable the search server to quickly determine the webpage that needs to be re-crawled through the comparison information provided by the terminal, so as to crawl the webpage that needs to be re-crawled. On the basis of effectively reducing the workload of crawling and the time required for each crawling, the waste of crawler computing resources caused by crawling a large number of un-updated webpages multiple times is also avoided.

According to embodiments of the present application, the present application also provides a terminal, a search server and a readable storage medium. Both the terminal and the search server can be set up on an electronic device.

Figure 7:
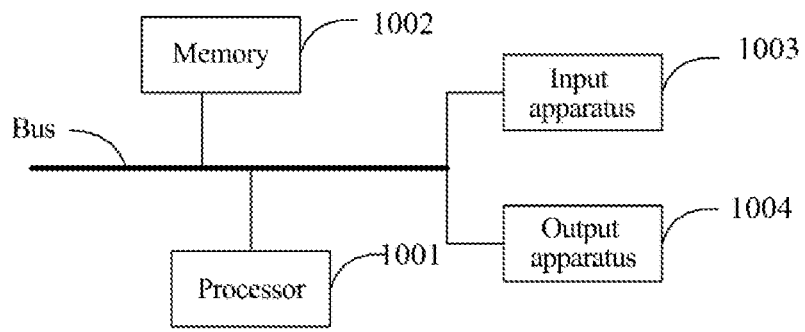
FIG. 7 is a block diagram of an electronic device for implementing a data updating method of embodiments of the present application.

As shown in FIG. 7, FIG. 7 is a block diagram of an electronic device for a data updating method according to an embodiment of the present application. The electronic device is intended to represent various forms of digital computers, such as a laptop computer, a desktop computer, a workstation, a personal digital assistant, a server, a blade server, a mainframe computer, and other suitable computers. The electronic device may also represent various forms of mobile apparatuses, such as a personal digital assistant, a cellular phone, a smart phone, a wearable device, and other similar computing apparatuses. Components shown herein, connections and relationships thereof, as well as functions thereof are merely examples and are not intended to limit implementations of the present application described and/or claimed herein.

As shown in FIG. 7, the electronic device includes: one or more processors 1001, a memory 1002, and interfaces for connecting various components, including a high-speed interface and a low-speed interface. The various components are interconnected through different buses and can be installed on a common motherboard or be installed in other ways as required. The processor can process instructions executed within the electronic device, where the instructions include instructions stored in or on the memory to display graphical information of Graphical User Interface (GUI) on an external input/output apparatus (such as, a display device coupled to an interface). In other implementations, a plurality of processors and/or a plurality of buses may be used with a plurality of memories, if required. Similarly, a plurality of electronic devices can be connected, each of which provides some of necessary operations (for example, serving as a server array, a set of blade servers, or a multiprocessor system). In FIG. 7, one processor 1001 is taken as an example.

The memory 1002 is a non-transitory computer-readable storage medium provided by the present application. The memory stores instructions executable by at least one processor to cause the at least one processor to perform the data updating method provided by the present application. The non-transitory computer-readable storage medium of the present application stores computer instructions, and the computer instructions are used to cause a computer to perform the data updating method provided by the present application.

The memory 1002, as a non-transitory computer-readable storage medium, can be used to store a non-transitory software program, a non-transitory computer-executable program and modules, such as program instructions/modules (e.g. the communication module 10, the crawling module 20 and the updating module 30 shown in FIG. 5)

corresponding to the data updating method in the embodiments of the present application. By running the non-transitory software program, instructions and modules stored in the memory 1002, the processor 1001 executes various functional applications and data processing of a server, that is, implements the data updating method in the above method embodiments.

The memory 1002 may include a program storing area and a data storing area, where the program storing area may store an operating system and an application program required by at least one function; and the data storing area may store data created according to the use of the electronic device of FIG. 7 and so on. In addition, the memory 1002 may include a high-speed random-access memory, and may also include a non-transitory memory, such as at least one magnetic disk storage device, a flash memory device, or other non-transitory solid-state memory devices. In some embodiments, the memory 1002 may optionally include memories set remotely with respect to the processor 1001, and these remote memories may be connected via a network to the electronic device of FIG. 7. Examples of the above-mentioned network may include, but are not limited to, the Internet, an intranet, a local area network, a mobile communication network and a combination thereof.

The electronic device of FIG. 7 may further include: an input apparatus 1003 and an output apparatus 1004. The processor 1001, the memory 1002, the input apparatus 1003 and the output apparatus 1004 may be connected via a bus or other means, and an example of a connection via the bus is shown in FIG. 7.

The input apparatus 1003 may receive inputted voice, digital or character information, and generate key signal inputs related to a user setting and functional control of the electronic device of FIG. 7. The input apparatus, for example, is a touch screen, a keypad, a mouse, a trackpad, a touchpad, an indication rod, one or more mouse buttons, a trackball, a joystick and other input apparatuses. The output apparatus 1004 may include: a voice play device, a display device, an auxiliary lighting apparatus (e.g., an LED), a tactile feedback apparatus (e.g., a vibration motor) and the like. The display device may include, but is not limited to, a liquid crystal display (LCD), a light emitting diode (LED) display and a plasma display. In some embodiments, the display device may be a touch screen.

Various embodiments of the systems and technologies described herein may be implemented in a digital electronic circuit system, an integrated circuit system, a specialized ASIC (application specific integrated circuit), computer hardware, firmware, software, and/or a combination thereof. These various embodiments may include: being implemented in one or more computer programs, where the one or more computer programs may be executed and/or interpreted on a programmable system including at least one programmable processor. The programmable processor may be a specialized or general-purpose programmable processor, which may receive data and instructions from a storage system, at least one input apparatus and at least one output apparatus, and send data and instructions to the storage system, the at least one input apparatus and the at least one output apparatus.

These computing programs (also referred to as programs, software, software applications, or codes) include machine instructions of a programmable processor and can be implemented using a high-level procedure and/or object-oriented programming language, and/or an assembly/machine language. As used herein, the terms "machine-readable medium" and "computer-readable medium" refer to any computer program product, device, and/or apparatus (e.g., a magnetic disk, an optical disk, a memory, a programmable logic device (PLD)) for providing machine instructions and/or data to the programmable processor, which includes a machine-readable medium that receives a machine instruction as a machine-readable signal. The term "machine-readable signal" refers to any signal used to provide a machine instruction and/or data to the programmable processor.

In order to provide interaction with a user, the systems and technologies described herein may be implemented on a computer, where the computer has: a display apparatus (e.g., a CRT (cathode ray tube) or LCD (liquid crystal display) monitor) for displaying information to the user; and a keyboard and a pointing apparatus (e.g., a mouse or a trackball), through which the user can provide inputs to the computer. Other types of apparatuses may also be used to provide interaction with the user; for example, the feedback provided to the user may be any form of sensing feedback (such as, visual feedback, auditory feedback, or tactile feedback); and the inputs from the user may be received in any form (including acoustic inputs, voice inputs, tactile inputs).

The systems and technologies described herein may be implemented in a computing system (e.g., a data server) including a back-end component, or in a computing system (e.g., an application server) including a middleware component, or in a computing system (e.g., a user computer having a graphical user interface or a web browser, through which the user can interact with the implementations of the systems and technologies described herein) including a front-end component, or in a computing system including any combination of the back-end component, the middleware component, or the front-end component. The components of the system may be interconnected via digital data communication (e.g., a communication network) in any form or medium. Examples of the communication network include: a local area network (LAN), a wide area network (WAN) and the Internet.

A computer system may include a client and a server. The client and the server are generally located far away from each other and usually interact with each other through a communication network. A relationship between the client and the server is generated by computer programs running on corresponding computers and having a client-server relationship between each other.

It should be understood that steps can be reordered, added, or deleted using the various forms of processes shown above. For example, the steps recited in the present application can be performed in parallel, in sequence or in different orders, as long as expected results of the technical solutions disclosed by the present application can be realized, and there is no limitation herein.

The above specific embodiments do not limit the protection scope of the present application. It should be understood by those skilled in the art that various modifications, combinations, sub-combinations and substitutions may be made according to design requirements and other factors. Any modification, equivalent replacement, improvement and others made within the spirit and principle of the present application shall be included in the protection scope of the present application.

What is claimed is:

1. A data updating method, applied to a search server, comprising:
   providing a terminal with a search result webpage,
      wherein the search result webpage comprises one or more webpages associated with a search keyword and a pre-stored webpage summary corresponding to each webpage, and the pre-stored webpage summary is summary information obtained by crawling webpage content of a webpage in advance;

receiving comparison information of a target webpage sent by the terminal, wherein the comparison information is obtained by the terminal by performing consistency comparison between a current webpage summary and the pre-stored webpage summary, and the current webpage summary is obtained by the terminal by crawling content of the target webpage when browsing the target webpage;

updating the pre-stored webpage summary of the target webpage according to the comparison information of the target webpage;

wherein the updating the pre-stored webpage summary of the target webpage according to the comparison information of the target webpage comprises:

crawling the target webpage to obtain an updated webpage summary, when it is determined according to the comparison information of the target webpage that the current webpage summary is inconsistent with the pre-stored webpage summary;

updating the pre-stored webpage summary using an obtained updated webpage summary;

wherein the updating the pre-stored webpage summary using the obtained updated webpage summary comprises:

collecting terminal configuration information of the terminal when the updated webpage summary is the same as the pre-stored webpage summary, crawling the target webpage in a crawling manner corresponding to the terminal configuration information, and taking an obtained webpage summary as the pre-stored webpage summary that is showed when the target webpage is searched out under the terminal configuration information;

wherein the terminal configuration information comprises information related to a geographic location where the terminal is located or an operator of a network where the terminal is located.

2. The data updating method according to claim 1, wherein the updating the pre-stored webpage summary using the obtained updated webpage summary further comprises:

taking the updated webpage summary as an updated pre-stored webpage summary directly when the updated webpage summary is different from the pre-stored webpage summary.

3. A data updating method, applied to a terminal, comprising:

receiving and showing a search result webpage provided by a search server, wherein the search result webpage comprises one or more webpages associated with a search keyword triggered by a user and a pre-stored webpage summary corresponding to each webpage, and the pre-stored webpage summary is summary information obtained by the search server by crawling webpage content of a webpage in advance;

determining a target webpage in the search result webpage, and crawling webpage content of the target webpage to obtain a current webpage summary;

performing consistency comparison between the current webpage summary and the pre-stored webpage summary to obtain comparison information, and sending the comparison information to the search server, so that the search server updates the pre-stored webpage summary according to the comparison information;

wherein when the search server determines, according to the comparison information of the target webpage, that the current webpage summary is inconsistent with the pre-stored webpage summary, the search server crawls the target webpage to obtain an updated webpage summary and updates the pre-stored webpage summary using an obtained updated webpage summary;

when the search server determines, according to the comparison information of the target webpage, that the updated webpage summary is the same as the pre-stored webpage summary, the search server collects terminal configuration information of the terminal, crawls the target webpage in a crawling manner corresponding to the terminal configuration information, and takes an obtained webpage summary as the pre-stored webpage summary that is showed when the target webpage is searched out under the terminal configuration information;

wherein the terminal configuration information comprises information related to a geographic location where the terminal is located or an operator of a network where the terminal is located.

4. The data updating method according to claim 3, wherein the method further comprises:

receiving a crawling strategy sent by the search server;

the crawling the webpage content of the target webpage to obtain the current webpage summary comprises:

using the crawling strategy to crawl the webpage content of the target webpage to obtain the current webpage summary.

5. The data updating method according to claim 3, before receiving and showing the search result webpage provided by the search server, further comprising:

sending the search keyword triggered by the user to the search server, so that the search server generates the search result webpage according to the search keyword.

6. A data updating apparatus, applied to a search server, comprising:

at least one processor; and a memory communicatively connected to the at least one processor; wherein, the memory stores instructions executable by the at least one processor, and the instructions are executed by the at least one processor to enable the at least one processor to:

provide a terminal with a search result webpage, wherein the search result webpage comprises one or more webpages associated with a search keyword and a pre-stored webpage summary corresponding to each webpage, and the pre-stored webpage summary is summary information obtained by crawling webpage content of a webpage in advance;

receive comparison information of a target webpage sent by the terminal, wherein the comparison information is obtained by the terminal by performing consistency comparison between a current webpage summary and the pre-stored webpage summary, and the current webpage summary is obtained by the terminal by crawling content of the target webpage when browsing the target webpage;

update the pre-stored webpage summary of the target webpage according to the comparison information of the target webpage;

wherein the at least one processor is further enabled to:
crawl the target webpage to obtain an updated webpage summary, when it is determined according to the comparison information of the target webpage that the current webpage summary is inconsistent with the pre-stored webpage summary;
update the pre-stored webpage summary using an obtained updated webpage summary;
wherein when the updated webpage summary is the same as the pre-stored webpage summary, the at least one processor is further enabled to:
collect terminal configuration information of the terminal;
crawl the target webpage in a crawling manner corresponding to the terminal configuration information;
take an obtained webpage summary as the pre-stored webpage summary that is showed when the target webpage is searched out under the terminal configuration information;
wherein the terminal configuration information comprises information related to a geographic location where the terminal is located or an operator of a network where the terminal is located.

7. The data updating apparatus according to claim 6, wherein when the updated webpage summary is different from the pre-stored webpage summary, the at least one processor is further enabled to take the updated webpage summary as an updated pre-stored webpage summary directly.

8. A data updating apparatus, applied to a terminal, comprising:
at least one processor; and
a memory communicatively connected to the at least one processor; wherein,
the memory stores instructions executable by the at least one processor, and the instructions are executed by the at least one processor to enable the at least one processor to perform the method according to claim 3.

9. The data updating apparatus according to claim 8, wherein the at least one processor is further enabled to:
receive a crawling strategy sent by the search server;
use the crawling strategy to crawl the webpage content of the target webpage to obtain the current webpage summary.

10. The data updating apparatus according to claim 8, wherein the at least one processor is further enabled to send the search keyword triggered by the user to the search server, so that the search server generates the search result webpage according to the search keyword.

11. A non-transitory computer-readable storage medium, wherein the non-transitory computer-readable storage medium stores computer instructions thereon, and when a processor executes the computer instructions, the method according to claim 1 is implemented.

12. A non-transitory computer-readable storage medium, wherein the non-transitory computer-readable storage medium stores computer instructions thereon, and when a processor executes the computer instructions, the method according to claim 3 is implemented.

* * * * *